United States Patent [19]

Aeschbacher

[11] 4,063,329
[45] Dec. 20, 1977

[54] APPARATUS FOR REMOVING A MIXTURE OF BLASTING MEDIA AND CLEANING RESIDUES FROM WORKPIECES TREATED WITH BLASTING MEDIA

[75] Inventor: Hans Manuel Aeschbacher, Schaffhausen, Switzerland

[73] Assignee: Georg Fischer Aktiengesellschaft, Schaffhausen, Switzerland

[21] Appl. No.: 742,455

[22] Filed: Nov. 17, 1976

[30] Foreign Application Priority Data
Nov. 21, 1975 Switzerland .................... 15106/75

[51] Int. Cl.$^2$ ............................................. B24C 9/00
[52] U.S. Cl. .................................. 15/306 A; 51/270; 51/8 SR
[58] Field of Search ............... 51/268, 270, 9 R, 14, 51/8 SR; 15/306 A, 308, 309, 316, 405

[56] References Cited

U.S. PATENT DOCUMENTS 2,204,588  6/1940  Guite ............................. 51/9 R

FOREIGN PATENT DOCUMENTS 1,652,255  10/1965  Germany ........................ 15/405
1,652,005  10/1971  Germany ........................ 51/8 SR Primary Examiner—James L. Jones, Jr.
Assistant Examiner—Roscoe V. Parker
Attorney, Agent, or Firm—Toren, McGeady and Stanger

[57] ABSTRACT

Apparatus for removing from a workpiece moving in a given feed direction a mixture of blasting media and cleaning residue located upon the workpiece particularly adaptable for use with workpieces having relatively large horizontal surfaces. A damming device is located relative to the moving workpiece to dam the mixture on the workpiece and cause it to accumulate in front of the damming device. A mechanical cross conveyer engages the dammed-up mixture adjacent the damming device and a blowoff device for blowing the mixture from the workpiece is also provided. A baffle plate is arranged to extend in a direction obliquely to the feed direction of the workpiece between the damming device and the blowoff device. The baffle plate is arranged to conduct the mixture blown off the workpiece by the blowoff device over the damming device and on to the cross conveyor.

10 Claims, 2 Drawing Figures

APPARATUS FOR REMOVING A MIXTURE OF BLASTING MEDIA AND CLEANING RESIDUES FROM WORKPIECES TREATED WITH BLASTING MEDIA

BACKGROUND OF THE INVENTION

The present invention relates generally to apparatus for removing from a moving workpiece a mixture of blasting media and cleaning residues accumulated on the surface of workpieces treated with blasting media and is more particularly adapted for use with workpieces having relatively larger horizontal surfaces. The invention involves operation by removal of the mixture by conveyance thereof in directions transverse to the feed direction of the workpiece and additionally by blasting.

An arrangement of the type to which the present invention relates to known from German DOS No. 652,005. In this prior art device, the entire mixture for blasting media and cleaning residues accumulating on the workpiece is blown off by means of a blowoff mechanism into a tank which is arranged above the passage through which the workpiece travels. The mixture is here removed by a conveyer device which may be, for example a screw.

A disadvantage of prior art arrangements of this type is that the entire mixture accumulating upon the workpiece from the blasting treatment must be blown off by the blowoff device into a tank or receptacle which is arranged at a higher level. Thus, the material or mixture must be raised and this leads to a disproportionately high consumption of air and tends to require correspondingly higher power input demands.

A further prior art arrangement which is generally intended for the blasting treatment of plates and bands is known from U.S. Pat. No. 2,204,588. In this device, belt conveyers are arranged on both sides of a blasting jet in a blast chamber transverse to the feed direction of the workpiece and baffle plates operate the conduct rebounding blasting media to these conveyers. As a result, a part of the blasting media is removed laterally while still inside the blast chamber. Outside the blast chamber there are arranged blowoff nozzles which tend to have an acuminated form and which blow off the remaining blasting medium in both directions. A disadvantage of this prior art arrangement is that the conveyer belts arranged in the blast chamber are subject to excessive wear and that a relatively large amount of blasting medium is conveyed under the belt and out of the blast chamber while resting upon the plate and it must be removed with a relatively high amount of blowoff power.

Additionally, the blowoff nozzles having the acuminated form are poorly suited for application with larger plate widths since the required air consumption will increase disproportionately in such an arrangement.

The present invention is directed toward overcoming problems arising in arrangements of the aforementioned type and avoiding inconveniences attendant therewith whereby larger amounts of blasting media and cleaning residues can be removed safely and economically from workpieces having relatively large horizontal surfaces.

SUMMARY OF THE INVENTION

Briefly, the present invention may be described as apparatus for removing a mixture of blasting media and cleaning residue from workpieces treated with blasting media and particularly workpieces which have a relatively large horizontal surface wherein the workpiece is moved through the apparatus in a given feed direction. The apparatus generally comprises damming means for damming the mixture on the workpiece, a mechanical cross conveyer engaging the dammed mixture adjacent the damming means, a blowoff device for blowing the mixture from the workpiece and baffle means arranged to extend in the direction obliquely to the feed direction of the workpiece between the damming means and the blowoff device. The baffle means is arranged to conduct the mixture which is blown off the workpiece by the blowoff device over the damming means and onto the cross conveyer.

In the operation of the device, as the workpiece is moved with the mixture of blasting media and cleaning residue thereon, it passes beneath the damming means and the mixture tends to accumulate in front of the damming means while some mixture passes beneath the damming means and remains on the workpiece. The mechanical cross conveyor is located in front of or downstream of the damming means taken in the direction of travel of the workpiece and it operates to convey mixture laterally to the sides of the workpiece or transversely to its feed direction. As the mixture remaining on the workpiece passes beneath the damming device, it is blown off the workpiece by the blowoff device. The blowoff device is arranged so that it blows the remaining mixture onto a baffle plate which extends at an oblique angle upwardly from the workpiece and tends to direct the blown off mixture over the damming means and back onto the cross conveyer.

The various features of novelty which characterize the invention are pointed out with particularity in the claims annexed to and forming a part of this disclosure. For a better understanding of the invention, the operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
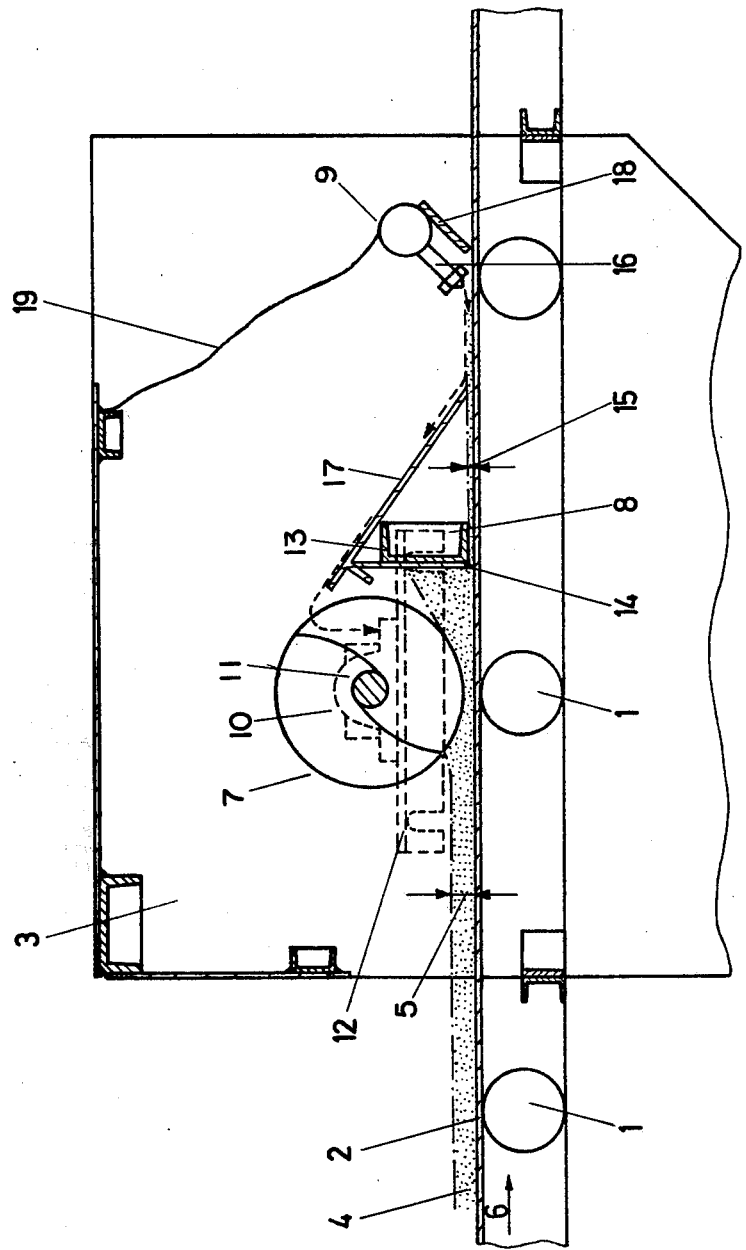
FIG. 1 is a longitudinal sectional elevation taken through an arrangement in accordance with the present invention.

Referring now to the drawings, wherein like reference numerals are used to refer to similar parts throughout the figures thereof, and more particularly to FIG. 1, there is shown an apparatus formed in accordance with the present invention which comprises a plurality of driven rollers 1 which convey a plate-like or band-shaped workpiece 2 in a direction indicated by the arrow 6 through a chamber 3. The workpiece 2 moving toward the chamber 3 is arriving from a blast chamber (not shown) and accumulated upon the upper surface of the workpiece is a mixture 4 which has built up to a layer thickness 5 due to the blasting which has been performed on the workpiece, the mixture 4 consisting of blasting media and cleaning residues.

Inside of the chamber 3 there are arranged in series, as viewed in the direction of feed of the workpiece, a cross conveyer 7, a damming device 8 which is arranged to be slightly elevated off the workpiece 2 and which is not in contact with the workpiece, and a blowoff device 9. The cross conveyer 7 may, for example, be formed to consist of a driven screw conveyer 10 which is mounted on each of its ends by means of bearings 11. The bearings 11 are arranged on vertically adjustable supports 12 which are secured upon the side walls of the chamber 3 so that the distance between the workpiece surface and the outer diameter of the conveyer screw 10 may be adjusted.

The damming device 8 consists of a support 13, which is also vertically adjustable and which is secure upon the side walls of the chamber 3. A static plate 14 is mounted as part of the damming device 8 and plate 14 is arranged to form an adjustable gap between the bottom edge of the plate 14 and the surface of the workpiece. As a result, when the workpiece is moved beneath the static plate 14 a damming effect will take place with regard to the accumulated mixture on the surface of the workpiece while a thin layer of mixture will pass beneath the static plate 14, the thickness of the mixture passing beneath the static plate 14 being dependent upon the gap between the bottom edge of the static plate 14 and the upper surface of the workpiece 2.

The blowoff device 9 includes nozzles 16 which are directed at an oblique angle to the workpiece surface, as shown in FIG. 1. Nozzles 16 may be provided in a plurality of nozzles extending laterally or transversely across the workpiece and they are arranged parallel to each other corresponding to the maximum width of the workpiece. Instead of individual nozzles 16 there may also be provided a continuous flat nozzle extending across the workpiece surface. Between the damming device 8 and the blowoff device 9 there is arranged a baffle plate 17 which is arranged to extend with a sloped or oblique orientation relative to the workpiece surface. The baffle plate 17 is arranged so that its direction of inclination is opposite to that of the direction of inclination of the nozzle 16. The baffle plate 17 is secured upon the damming device 8 and is arranged to be adjustable in height together with the device 8. The function of the baffle plate 17 is to deflect and conduct residual mixture which is blown off of the workpiece 2 by the blowoff device 9 over the damming device 8 and onto the screw conveyer 10. Thus, in its function, the baffle plate 17 operates to localize and control the blowoff area or blowoff point and also to prevent mixture from accumulating in front of or downstream of the blowoff device taken in the direction of movement of the workpiece.

Upon the blast nozzle 16 there is arranged a continuous screening plate 18 extending parallel to the blasting jet of the nozzles, with plate 18 forming a small gap with the work surface. Thus, mixture particles blown by the nozzles in the direction opposite to their inclination, that is toward the feeding direction of the workpiece, may thus, to a great extent, be stopped or deflected before they are permitted to move beyond the location of the nozzles 16. A flexible curtain 19 is arranged to extend from the upper ceiling or top of the chamber 3 down to the blowoff device 9. The curtain 19 may be made, for example, of rubber and it operates to prevent mixture particles which are blown upwardly into the space above the workpiece 2 from being projected forwardly, taken relative to the direction of the workpiece, and from thereby accumulating upon the workpiece surface downstream of the blowoff device 9.

During the operation of the apparatus of the present invention, as the workpiece 2 moves to the right in the direction of the arrow 6 as viewed in FIG. 1, the mixture 4 accumulated upon the workpiece 2 will be present up to a layer thickness 5 in the area of the workpiece upstream of the damming device 8 or the left thereof as viewed in FIG. 1. As the workpiece 2 moves to the right, the mixture 4 will be dammed or caused to accumulate at the left of the damming device in the manner previously described. Thus, a blocking of the mixture 4 will occur and the mixture 4 will be prevented from moving to the right of the damming device while also being caused to accumulate or build up in front of the damming device and to the left thereof. The screw conveyer 10, as will be seen in FIG. 1, is located immediately to the left of the damming device 8. Thus, as the mixture 4 builds up by virtue of the damming effect of the device 8, this will facilitate engagement by the screw conveyer 10 of the accumulating mixture 4 and as a result, the screw conveyer 10 will operate to remove the mixture in directions laterally or transversely of the feed direction of the workpiece 2.

If the screw conveyer 10 is designed with differing slope directions from its center taken in both directions thereof, the mixture will be removed toward both sides. The mixture 4 remaining upon the workpiece 2 as a result of the gap which exists between the static plate 14 and the upper surface of the workpiece 2 will be arranged in a layer accumulation having a thickness 15 which corresponds to the width of the gap between the bottom edge of the static plate 14 and the upper surface of the workpiece 2. The layer thickness 15 will be a constant reduced layer thickness and it is this thickness which will be blown off by the blowoff device 9 after the reduced layer thickness 15 passes beneath the static plate 14 and beneath the lower edge of the baffle plate 17. Thus, when the reduced thickness layer 15 passes to the right of the lower edge of the baffle plate 17, the nozzles 16 will blow the residual mixture leftwardly or backwardly taken relative to the direction of feed of the workpiece 2 and the residual mixture will be caused to move upwardly along the inclined surface of the workpiece 17, over the damming device 8 and back onto the screw conveyer 10 whereby it may be laterally removed off the workpiece in the manner previously described.

When the gap between the lower edge of the static plate 14 and the upper surface of the workpiece 2 forming the reduced thickness layer 15 is set to a width of between 1 to 10 mm, a reduction of the quantity of mixture to be blown off to about 10 to 20% of the mixture arriving in front of the stripping device is possible. The width of the gap 15 depends to a great extent upon the planeness or trueness of the flat upper workpiece surface and if a sufficient reduction can be accomplished the required blowoff power will be substantially reduced.

Tests have shown that with plates of 4 mm in width, the previously required blowoff power of about 220 HP in an arrangement equipped only with blowoff nozzles, may be reduced to about 20 HP with the arrangement described hereabove. Little power is required for the mechanical cross conveyers and instead of the screw conveyer described herein there may also be used other mechanical cross conveyer devices such as conveyer belts, bucket conveyers and the like.

Figure 2:
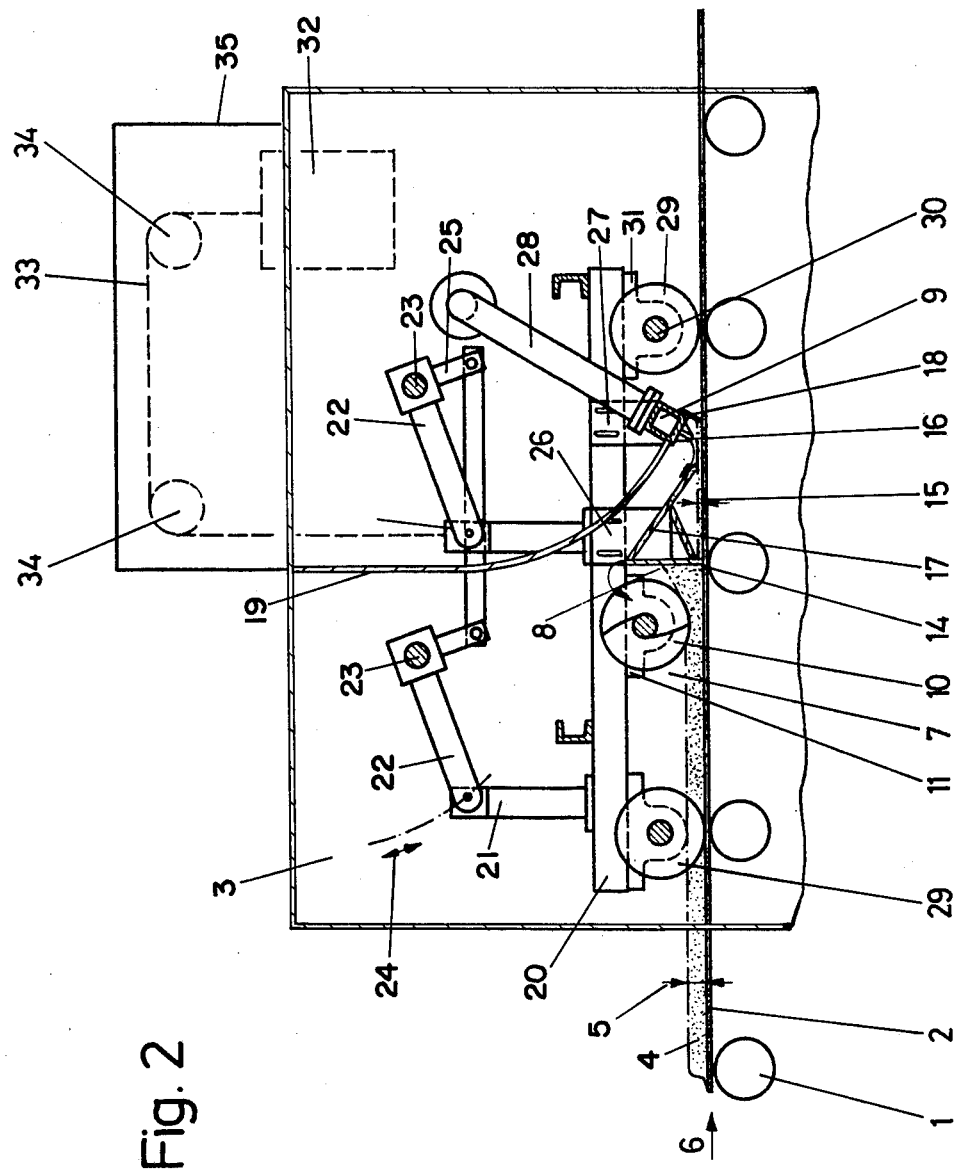
FIG. 2 is a longitudinal sectional elevation of another embodiment of the invention.

If plates or bands of different thickness are frequently to be blasted, it is of advantage if the entire arrangement consisting of the cross conveyer 7, the damming device 8, the baffle plate 17 and blowoff device 9 can be displaced jointly in chamber 3 in a vertical or substantially vertical direction and if it may be made to thereby cooperate with a scanner which will assure that the entire arrangement may always have the same distance from the workpiece surface. Such an arrangement consituting another embodiment of the present invention is depicted in FIG. 2. A frame 20 is suspended by means of lifting rods 21 and levers 22 on shafts 23 operatively connected by a parallelogram linkage 25 in such a manner that a frame 20 may be displaced in a substantially vertical direction within the chamber 3 by movement corresponding in direction to that indicated by the arrow 24. The shafts 23 are rotatably mounted in bearing blocks secured upon the side walls of the chamber 3.

Naturally it is also possible to arrange the frame 20 in the chamber 3 for the displacement in vertical directions by connecting link guides arranged vertically upon the side walls of the chamber 3.

Upon the frame 20 there is rotatably mounted by means of bearings 11 the cross conveyer 7 which consists of the driven screw conveyer 10. Behind the screw conveyer 10, as viewed in the conveying direction or feed direction 6 of the workpiece, there is arranged the damming device 8 which includes the static plate 14 and which is secured by means of a slide plate 26. The damming device 8 is arranged so as to be adjustable in the vertical direction together with the baffle plate 17. The air supply to the nozzles 16 is effected by means of a moving hose line 28 with a screening plate 18 being secured upon the blowoff device 9 parallel to the blasting jet thereof in order to form an adjustable gap with the workpiece surface.

On the front and rear end of the frame 20 there are arranged rotatable guide rollers 29 which form the device scanning the workpiece surface and which are arranged on two horizontal shafts 30 each resting in two bearing blocks 31 secured to the frame 20. The guide rollers 29 are preferably designed as thin discs so that they may penetrate through the mixture accumulated upon the workpiece surface and be continuously in contact with the surface of the workpiece 2. Several discs may be provided parallel to each other on the shafts 30. In order to reduce the bearing pressure of the guide rollers 29 upon the workpiece surface, the entire arrangement shown in FIG. 2 may be provided with a counterweight 32 which is suspended upon a chain 33 secure upon the frame 20 and extending over rollers 34, the counterweight 32 being housed in a laterally arranged chamber 35.

The flexible curtain 19 is arranged between the blowoff device 9 and the ceiling of the chamber 3 and prevents mixture particles from being propelled behind the blowoff device 9 downstream of the direction of the moving workpiece 2.

On one of the shafts 23 there is arranged, by means of a lever outside of chamber 3, a lifting cylinder (not shown) by means of which the entire arrangement may be lifted from the workpiece surface.

The method of operation for the removal of the mixture corresponds essentially to that already described with regard to the embodiment of FIG. 1 and an essentially similar mode of operation is involved with the present embodiment.

It will be seen that the arrangement according to the present invention permits a substantial reduction in the operating costs of the equipment involved and in the required investments for the power which is to be expended in accomplishing the blowoff operation.

While specific embodiments of the invention have been shown and decribed in detail to illustrate the application of the inventive principles, it will be understood that the invention may be embodied otherwise without departing from such principles.

What is claimed is:

1. Apparatus for removing a mixture of blasting media and cleaning residue from workpieces treated with blasting media, said workpieces being moved through said apparatus in a given feed direction, said apparatus comprising damming means for damming said mixture on said workpiece, a mechanical cross conveyer engaging the dammed mixture adjacent said damming means, a blowoff device for blowing said mixture from said workpiece, and baffle means arranged to extend in a direction obliquely from said workpiece and from said feed direction thereof between said damming means and said blowoff device, said baffle means being arranged to conduct said mixture blown off said workpiece by said blowoff device over said damming means and onto said cross conveyer.

2. Apparatus according to claim 1 wherein said baffle means comprises a plate extending from adjacent said blowoff device at a point proximate said workpiece to a point over said damming means, said plate being configured to direct mixture onto said cross conveyer.

3. Apparatus according to claim 1 wherein said cross conveyer comprises a conveyer screw which is adjustable with regard to the distance thereof relative to the surface of said workpiece.

4. Apparatus according to claim 3 wherein said screw conveyer is arranged to convey said mixture from the surface of said workpiece in two directions laterally outwardly across said workpiece and transversely to the feed direction thereof.

5. Apparatus according to claim 1 wherein said damming means is arranged to define an adjustable gap with the surface of said workpiece.

6. Apparatus according to claim 5 wherein said cross conveyer includes a screw conveyer having a lower circumferential part spaced a distance from the surface of said workpiece and wherein said adjustable gap between said damming device and said workpiece surface is smaller than the distance between the workpiece surface and the lower circumferential part of said screw conveyer.

7. Apparatus according to claim 1 further comprising a frame having said cross conveyer, said damming means, said baffle means and said blowoff device arranged thereon, said frame being displaceable in a substantially vertical direction, said apparatus further comprising a scanning device for scanning the workpiece surface operatively connected with said frame.

8. Apparatus according to claim 7 wherein said scanning device comprises guide rollers arranged on said frame and in contact with the surface of said workpiece.

9. Apparatus according to claim 1 further including a screening plate forming a gap with said workpiece surface, said screening plate being arranged on said blowoff device parallel to the blasting jet thereof.

10. Apparatus according to claim 1 wherein said damming means, said mechanical cross conveyer said blowoff device and said baffle means are all arranged within an enclosed chamber overlying said workpiece and including a roof, said apparatus further including a flexible curtain extending from the roof of said chamber down to said blowoff device to prevent portions of said mixture from being deflected beyond said blowoff device in a direction forwardly of said feed direction of said workpiece.

* * * * *